Aug. 8, 1950   G. T. MUNDORFF   2,517,590
COMPUTER FOR FLASH AND FLOOD LAMP PHOTOGRAPHY
Filed May 24, 1948   2 Sheets-Sheet 1
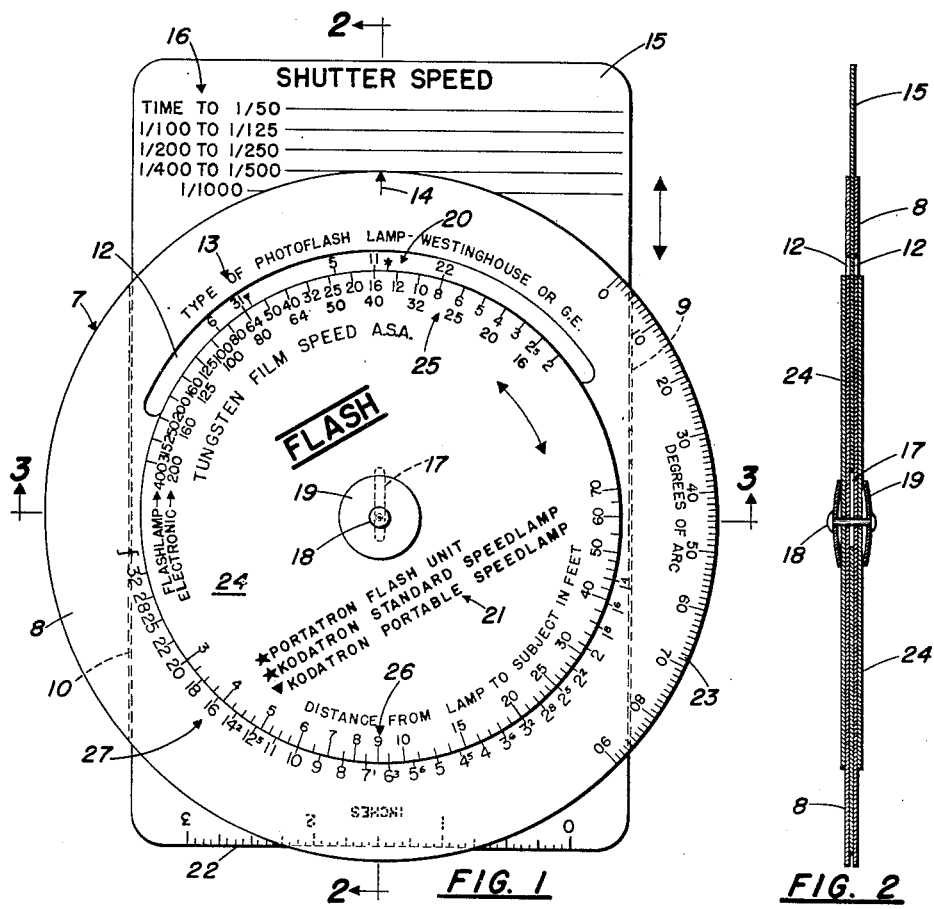
FIG. 1
FIG. 2
FIG. 3
Inventor
GEORGE T. MUNDORFF
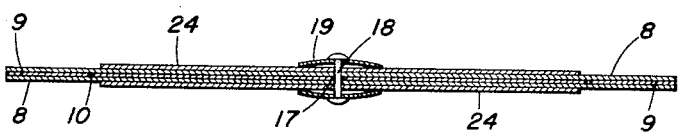
Attorney Aug. 8, 1950  G. T. MUNDORFF  2,517,590
COMPUTER FOR FLASH AND FLOOD LAMP PHOTOGRAPHY
Filed May 24, 1948  2 Sheets-Sheet 2
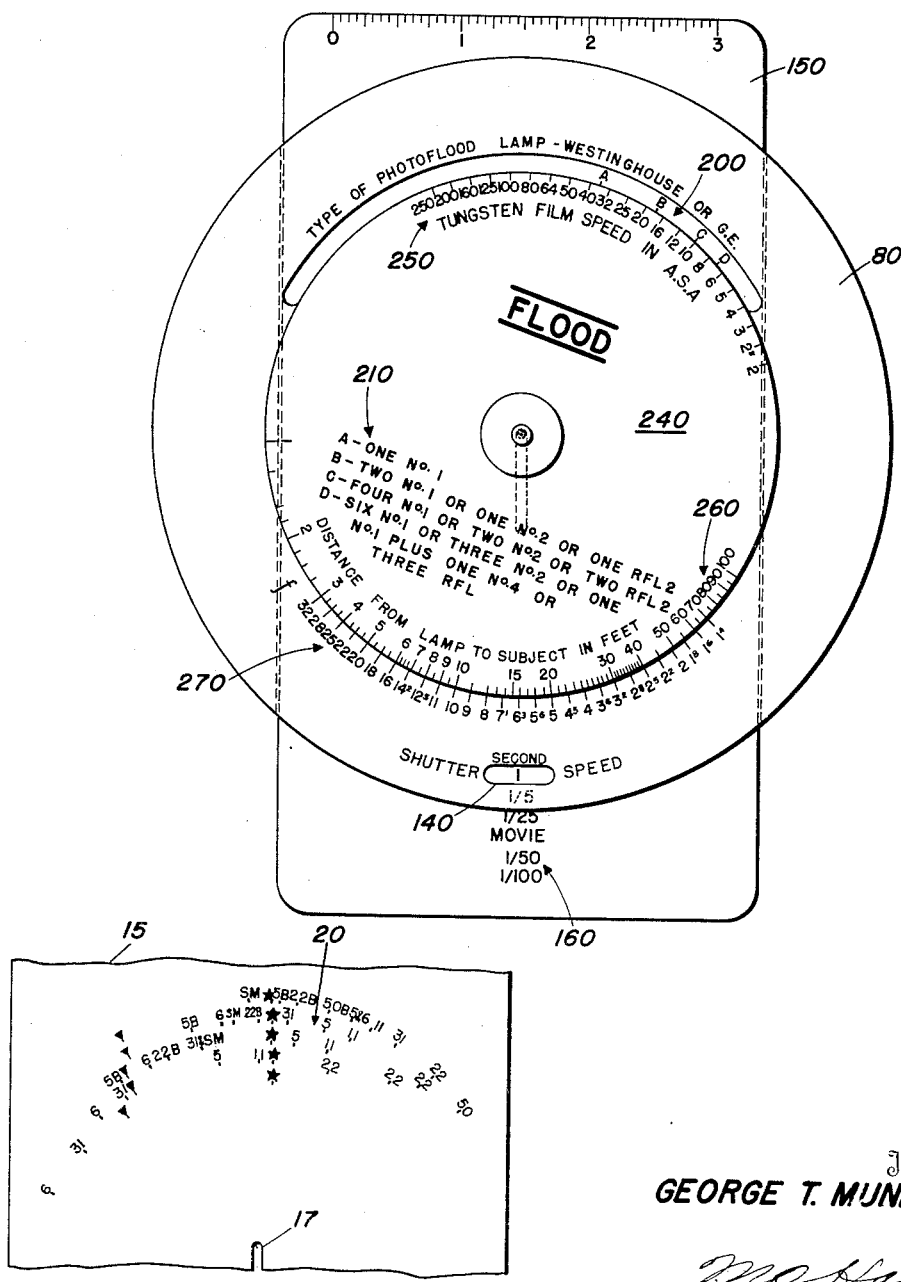
Inventor
GEORGE T. MUNDORFF Patented Aug. 8, 1950

2,517,590

UNITED STATES PATENT OFFICE 2,517,590

COMPUTER FOR FLASH AND FLOOD LAMP PHOTOGRAPHY

George T. Mundorff, United States Navy, Washington, D. C.

Application May 24, 1948, Serial No. 28,958

4 Claims. (Cl. 235—64.7)

(Granted under the act of March 3, 1883, as amended April 30, 1928; 370 O. G. 757)

This invention relates to a photographic computing device for conveniently and accurately obtaining camera adjustments for any given set of conditions where flash or flood lighting is utilized.

More particularly, the present invention contemplates an instrument comprising several relatively shiftable members, each carrying its part of some scales and groups of data pertaining to the type of lamp, the film speed, the shutter speed, the distance of the lamp from the subject and the diaphragm opening; whereby, when most of these factors are known, the instrument may be manipulated to solve for the unknowns. Especially, it is desired to find the correct aperture or diaphragm opening when the other factors are known.

Prior to this invention it has been necessary to refer to tables to obtain the film speed and guide number for the film, lamp and shutter speed in use. The guide number was then divided by the distance in feet of the lamp from the subject, the quotient being the f-number, or aperture, for correct exposure. This old method requires that numerous reference papers be carried, and the result is always subject to errors of computation.

It is the primary object of the present invention to devise an instrument, of the class above mentioned, which gives accurate information without reference to instruction booklets and without mathematical calculations.

Another major object of this invention is to provide a computing device having relatively movable parts for interpreting exposure, film speed and type of lamp in terms of distance from the subject, and from these terms ascertaining the correct apertures. In this connection, it is an object to reverse the computing procedure, or to find an unknown factor where the remaining factors are known.

It is a further object to construct a compact and sturdy instrument of novel design and facile operation, for photographic computations and any other purposes to which it may be adapted.

The foregoing and other objects of the present invention should clearly appear from a study of the following description when taken in conjunction with the accompanying drawings, wherein:

Fig. 1 is a view of one face of a suitable embodiment of the invention, with data and scales provided thereon for use with flash lamps;

Fig. 2 represents a section taken on the vertical plane of line 2—2, Fig. 1;

Fig. 3 is a sectional view taken on the horizontal plane of line 3—3, Fig. 1;

Fig. 4 is a fragmentary face view of that portion of the rectangular panel that underlies the lamp and film speed data; and Fig. 5 is a face view of preferred embodiment, slightly modified structurally, and carrying scales and data for use with flood lamps.

With continued reference to the drawings, and with particular reference first to Figs. 1 to 4, numeral 7 designates generally a main frame for adjustably supporting certain other parts. It comprises a pair of opaque plates 8, of any desired shape but here shown circular in form, separated by a pair of segment-shaped strips 9 which, between them, provide a wide slot 10 for a purpose presently disclosed. The reason for two plates and further twin appurtenances later described is to permit computations to be made for more than one type of lamp. This results in differences in indicia at opposite sides of the device but, structurally, the sides are symmetrical. One side may be described as follows:

The plate 8 has an elongated, arcuate through slot 12, and above this slot there is printed data 13 showing the "Type" of flash lamp to be used for the photo. Directly above this data there is an upwardly pointing arrow 14.

A thin flat panel 15 is vertically slidable within the frame slot 10 and it carries data 16 denoting "Shutter speed." The various times or speeds are laid out in horizontal lines for cooperation with the head of the arrow 14. The panel has a vertical central slot 17, preferably of a length equal to the vertical dimension of the data 16, permitting the panel to slide with respect to a pin or rivet 18 that is centrally and stationarily extended through the frame plates 8. Retaining washers 19 surround the pin ends and may be convex with slight spring action to cause the panel and certain other parts to be frictionally gripped.

The panel 15, as seen partially in Fig. 1 and as shown fully in Fig. 4, carries a plurality of arcuate sets of indicia 20 to denote the types or lighting values of numerous flash lamps. These sets are spaced apart concentrically at distances equal to the spacings of the rows of data 16 so that each set is visible through the arcuate slot 12 when its corresponding shutter speed line is intersected by the head of the arrow 14.

For the convenience of the operator the panel 15 may carry an inch scale 22 on one edge (and a scale in centimeters, not shown, on the opposite side), and the plate 8 may carry a protractor scale 23 for determining the field of view. There also is wording 21 printed on an opaque disc 24 yet to be described, in explanation of certain symbols used in the sets of data 20. There are two of the discs 24, mounted rotatably on the ends of the pin 18 and of the same radius as the inner arc of the slot 12. Each disc is marked as follows:

In normal use the disc 24 has a "Film speed"

scale 25 disposed opposite the slot 12 so that any selected speed may be set against the particular selected or available lamp from the data 20. This scale is marked in both flash and electronic lamp units. One or both discs also may carry data showing the speeds of the different makes of commercial film. At the opposite side of the disc there is a "Distance" scale 26 showing the number of feet from lamp to subject, and bordering upon this there is an "f" scale 27 of diaphragm openings.

Now, having selected a shutter speed and shifted the panel 15 accordingly, and knowing the film speed, the speed value is set in radial alignment with the lamp to be used. This setting automatically oscillates the scale 26 so that its distance units are disposed opposite the correct aperture sizes. Thus, the diaphragm may be set to obtain optimum results for any given distance. Obviously, a reverse procedure may be used to find a correct shutter speed for a particular lamp; and any unknown one of the factors may be determined if the others are known.

The film speed is expressed in American Standards Association values. The distance scale 26 is a simple logarithmic one of such proportions as to facilitate reading of the figures. In the "f" scale each number bears a definite relationship to the next higher value marked on the scale. This proportion is determined by comparison of the squares of the f-numbers, which arises from the fact that the light admitted by any given lens is inversely proportional to the square of the f-number. (Thus an aperture of f/4 passes four times the amount of light admitted by the same lens at f/8: $8^2 \div 4^2 = 4$). The indicated markings are inscribed to the same proportions as the logarithmic scale on the inner disk and are inverted with respect to each other. The product of opposing markings thus remains constant throughout the length of the scale. A direct analogy thus exists between this scale and the guide number assigned each flash lamp by the various manufacturers. The flash lamp guide number, for any given film and shutter speed, is a constant which is the product of the distance from the lamp to the subject and the f-number. This relationship may then be used to inscribe the scale 20.

The instrument shown in Fig. 5 differs chiefly in that, in lieu of the arrow 14, a time unit encircling slot 140 is provided in the plate 80 to indicate shutter speeds as the panel 150 is shifted. The speed values are different because this device is designed for use with flood lamps. For the same reason the lamp data 200 differs from the data 20 and the scales 250 and 260 are slightly different than 25 and 26. The "f" scale is substantially unchanged. The disc 240 carries data 210 for interpreting the lamp symbols.

Either form of instrument of course may be used with either flash or flood lighting by properly computing and locating the data and scale values.

Although the windows 12 and 140 are shown as slots, they obviously may consist of similarly shaped sections of transparent material, either filled into slots or formed as integral portions of the otherwise opaque discs of which they are parts.

Obviously many modifications and variations of the present invention are possible in the light of the above teachings. It is therefore to be understood that within the scope of the appended claims the invention may be practiced otherwise than as specifically described.

The invention herein described may be manufactured and used by or for the Government of the United States of America for governmental purposes without the payment of any royalties thereon or therefor.

What is claimed as new and desired to be secured by Letters Patent of the United States is:

I claim:

1. A device of the character described, comprising a minimum of three relatively shiftable flat parts arranged in superposed relationship; said parts having surfaces carrying data and scales in terms of the factors of camera shutter speed, film speed, type of lamp, distance of lamp from subject and aperture size, said data and scales being so related that with four of the factors known the fifth can be determined by setting said parts to preselected relative positions.

2. A device of the character described, comprising a flat frame, a parallel panel slidable in said frame, and a pair of discs rotatably mounted on opposite sides of said frame so that the panel is common thereto; both sides of the frame, both sides of the panel and one side of each of said discs having correlated data thereon for computational purposes.

3. A device of the character described, comprising a flat frame, a parallel panel slidably mounted by said frame, and a disc rotatably mounted on said frame in overlying relation to said panel; said panel carrying data that can be brought into position adjacent the rim of the disc by sliding the panel, said frame carrying data adjacent another portion of the disc rim, and said disc carrying two sets of correlated data adjacent its periphery for cooperation with the data on the panel and the frame.

4. In a computer for flash or flood lamp photography, a flat frame, a parallel panel slidably mounted at one side of the frame, a disc rotatably mounted at the other side of the frame and opposite the panel, lamp type data arranged in rows on the face of said panel and movable into position adjacent said disc by sliding the panel, a set of shutter speed values marked on said panel and means afforded by said frame for cooperation with said values, a scale of aperture sizes on said frame adjacent the rim of said disc, a film speed scale on said disc adjacent said lamp type data, and another scale on said disc adjacent the scale of aperture sizes and indicating distances from the lamp to the subject.

GEORGE T. MUNDORFF.

REFERENCES CITED

The following references are of record in the file of this patent:

UNITED STATES PATENTS

| Number | Name | Date |
| --- | --- | --- |
| 1,881,165 | Becker | Oct. 4, 1932 |

FOREIGN PATENTS

| Number | Country | Date |
| --- | --- | --- |
| 6,298 | Great Britain | Mar. 16, 1909 |

OTHER REFERENCES

"Special Slide Rules," by J. N. Arnold, pp. 12, 13 and 19–33, published in 1933 by Purdue University of La Fayette, Indiana.